(12) United States Patent
Warner et al.

(10) Patent No.: US 8,930,443 B1
(45) Date of Patent: Jan. 6, 2015

(54) DISTRIBUTED NETWORK PAGE GENERATION

(75) Inventors: William Haywood Warner, Seattle, WA (US); Jeremy Boynes, Mercer Island, WA (US); Shaun M. Vickers, Seattle, WA (US); Wisam Z. Yasen, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 506 days.

(21) Appl. No.: 13/051,383

(22) Filed: Mar. 18, 2011

Related U.S. Application Data

(60) Provisional application No. 61/315,647, filed on Mar. 19, 2010.

(51) Int. Cl.
*G06F 15/16* (2006.01)

(52) U.S. Cl.
USPC .................................................. 709/203

(58) Field of Classification Search
USPC .................................................. 709/203
See application file for complete search history.

(56) References Cited

U.S. PATENT DOCUMENTS

| | | | |
|---|---|---|---|
| 7,389,330 B2 * | 6/2008 | Dillon et al. | 709/219 |
| 7,783,757 B2 * | 8/2010 | Plamondon | 709/225 |
| 8,176,163 B1 * | 5/2012 | Fikes et al. | 709/223 |
| 8,429,249 B2 * | 4/2013 | Yuan | 709/219 |
| 2003/0088580 A1 * | 5/2003 | Desai et al. | 707/104.1 |
| 2003/0110234 A1 * | 6/2003 | Egli et al. | 709/217 |
| 2005/0021694 A1 * | 1/2005 | Yuan | 709/220 |
| 2006/0277248 A1 * | 12/2006 | Baxter et al. | 709/201 |
| 2006/0277596 A1 * | 12/2006 | Calvert et al. | 726/3 |
| 2007/0050375 A1 * | 3/2007 | Chintalapati et al. | 707/10 |
| 2007/0294371 A1 * | 12/2007 | Petri | 709/219 |
| 2011/0055683 A1 * | 3/2011 | Jiang | 715/234 |
| 2011/0145321 A1 * | 6/2011 | Jiang | 709/203 |
| 2011/0270959 A1 * | 11/2011 | Schlusser et al. | 709/223 |

* cited by examiner

*Primary Examiner* — Kevin Bates
*Assistant Examiner* — SM Rahman
(74) *Attorney, Agent, or Firm* — Thomas Horstemeyer, LLP

(57) ABSTRACT

Disclosed are various embodiments for distributed generation of network pages from portions of network pages. A first request for a network page is obtained. A second request for a network page portion is sent to a server application. The second request includes a protocol header that specifies a base uniform resource locator (URL). The network page portion is obtained from the server application. The network page portion is based at least in part on the base URL. The network page is generated from the network page portion and other data.

22 Claims, 8 Drawing Sheets

DISTRIBUTED NETWORK PAGE GENERATION

CROSS REFERENCE TO RELATED APPLICATION

This application claims priority to U.S. Provisional Patent Application entitled "Requesting Content over a Network" filed on Mar. 19, 2010 and assigned application No. 61/315,647, which is incorporated herein by reference in its entirety.

BACKGROUND

Network pages, such as web pages, have grown increasingly complex to assemble. In years past, most network pages were static files containing hypertext markup language. Network page servers were configured simply to read the files from a data store and serve them up to browser applications. Now, nearly all network pages are dynamically generated by template engines and/or other network page generation software.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to distributed generation of network pages through the use of externally generated network page portions. For a variety of reasons, it may be desirable that certain portions of a network page be generated by a third party. For example, the third party may want to retain control over the portion of the network page. Also, the third party may have internal access to computing resources or information resources that it does not wish to provide to external users.

Various embodiments of the present disclosure facilitate third-party generation of network page portions, which may be assembled into network pages that are served up to clients. Such network page portions may be termed, for example, widgets, pagelets, portlets, includes, page components, and so on. In various embodiments, a lightweight protocol based on hypertext transfer protocol (HTTP) is employed. Such a modified HTTP-based protocol simplifies the serving up of data such as hypertext markup language (HTML), JavaScript object notation (JSON), cascading style sheets (CSS), JavaScript, etc. because the data can be served up directly without re-encoding or escaping at the application layer. The protocol includes support for Ajax, cookies, sessions, caching, endpoint discovery, and other features as will be described. In the following discussion, a general description of the system and its components is provided, followed by a discussion of the operation of the same.

Figure 1:
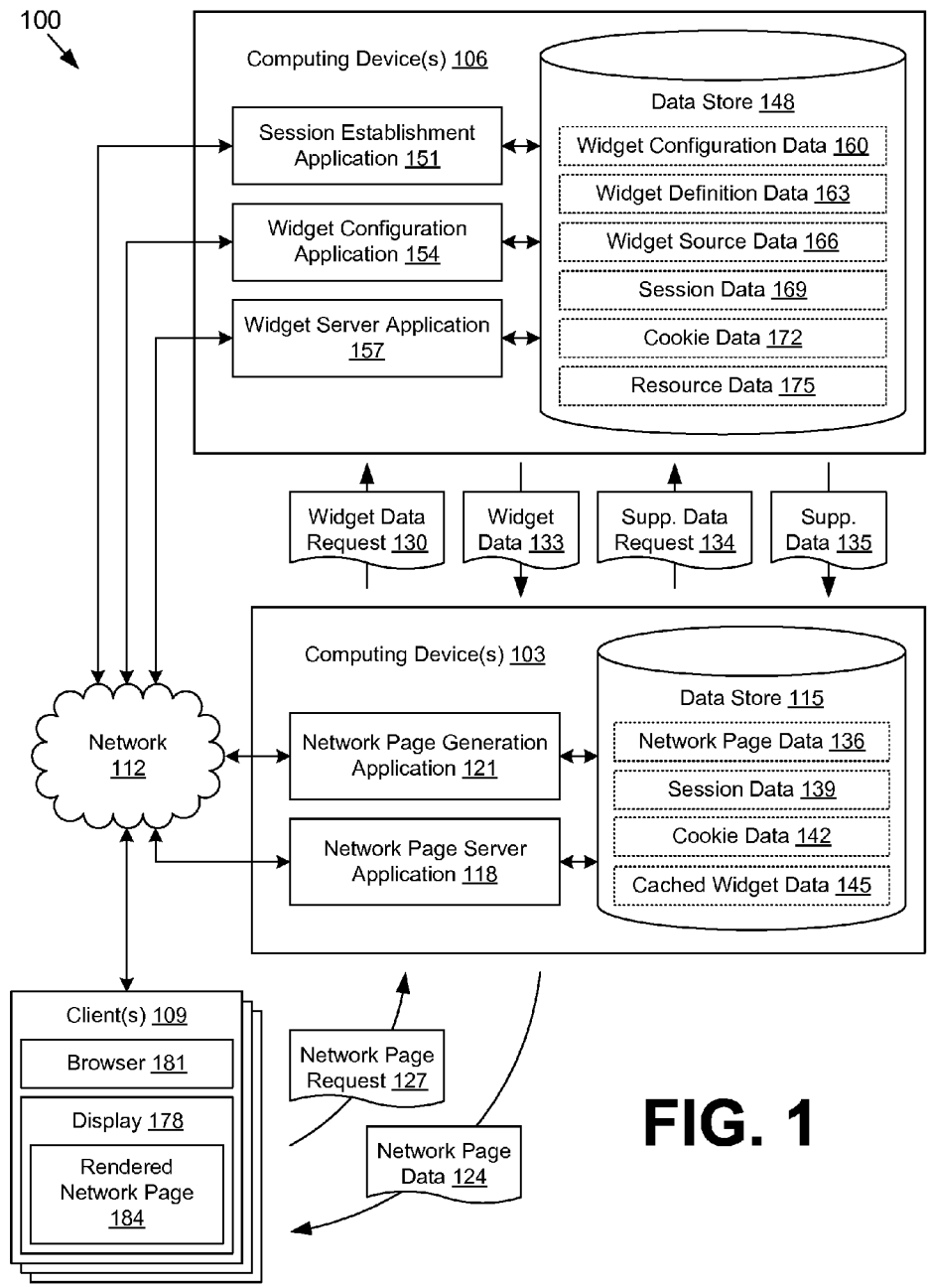
FIG. 1 is a drawing of a networked environment according to various embodiments of the present disclosure.

With reference to FIG. 1, shown is a networked environment 100 according to various embodiments. The networked environment 100 includes one or more computing devices 103, one or more computing devices 106, and one or more clients 109 in data communication by way of a network 112. The network 112 includes, for example, the Internet, intranets, extranets, wide area networks (WANs), local area networks (LANs), wired networks, wireless networks, or other suitable networks, etc., or any combination of two or more such networks. In some embodiments, the computing devices 103 and the computing devices 106 may be in different domains. Also, the computing devices 106 may be operated by entities that are different from one another and different from the entity that operates the computing devices 103.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 115 that is accessible to the computing device 103. The data store 115 may be representative of a plurality of data stores 115 as can be appreciated. The data stored in the data store 115, for example, is associated with the operation of the various applications and/or functional entities described below.

The components executed on the computing device 103, for example, include a network page server application 118, a network page generation application 121, and other applications, services, processes, systems, engines, or functionality not discussed in detail herein. The network page server application 118 is executed to serve up network page data 124 containing network pages and/or other data in response to network page requests 127. As used herein, the term "network page" may refer to web pages, gopher pages, and/or other pages that include HTML content, extensible HTML (XHTML) content, extensible markup language (XML) content, plain-text content, and/or any other form of network content. Network pages may include CSS, JavaScript and other client-side code, images, audio, applets, Flash objects, video, and/or other content items. Various network pages may include dynamic HTML or Ajax content that may obtain additional data and render updates asynchronously. The network page server application 118 may include a commercially available HTTP server such as Apache® HTTP Server, Apache® Tomcat®, Microsoft® Internet Information Services (IIS), and/or other HTTP servers.

The network page generation application 121 is executed in association with the network page server application 118 to obtain network page requests 127 and generate network pages in fulfillment of the network page requests 127. Various network pages may include network page portions that are generated by external servers, e.g., server applications executed in the computing devices 106. To obtain the network page portions, the network page generation application 121 issues widget data requests 130 to the external servers. The widget data requests 130 correspond to modified HTTP requests. In response, the network page generation application 121 obtains widget data 133 from the external servers, which may include the network page portions and other related data.

In addition, the network page generation application 121 may issue supplemental data requests 134 to the external servers. The supplemental data requests 134 may correspond to modified HTTP requests. The supplemental data request 134 may also correspond to Ajax requests or callbacks. In response, the network page generation application 121 obtains supplemental data 135 from the external servers, which may include data related to the network page portions, e.g., Ajax data or other data. The network page generation application 121 generates the requested network pages from the network page portions and other data.

The data stored in the data store 115 includes, for example, network page data 136, session data 139, cookie data 142, cached widget data 145, and potentially other data. The network page data 136 includes templates, code, HTML, XML, CSS, extensible style sheet language transformations (XSLT), images, audio, video, multimedia, and/or other data that are used by the network page generation application 121 in generating network pages. The session data 139 includes data relating to user sessions that have been recently active. Such user sessions may be established with the network page generation application 121 and/or external servers. The cookie data 142 includes data relating to cookies that have been set by the network page generation application 121 and/or external servers. The cached widget data 145 corresponds to cached versions of the widget data 133 and/or the supplemental data 135 that may be cached according to caching support enabled in HTTP. In addition, the cached widget data 145 may include configuration data and/or definition data relating to the external servers.

The computing device 106 may comprise, for example, a server computer or any other system providing computing capability. Alternatively, a plurality of computing devices 106 may be employed that are arranged, for example, in one or more server banks or computer banks or other arrangements. For example, a plurality of computing devices 106 together may comprise a cloud computing resource, a grid computing resource, and/or any other distributed computing arrangement. Such computing devices 106 may be located in a single installation or may be distributed among many different geographical locations. For purposes of convenience, the computing device 106 is referred to herein in the singular. Even though the computing device 106 is referred to in the singular, it is understood that a plurality of computing devices 106 may be employed in the various arrangements as described above.

Various applications and/or other functionality may be executed in the computing device 106 according to various embodiments. Also, various data is stored in a data store 148 that is accessible to the computing device 106. The data store 148 may be representative of a plurality of data stores 148 as can be appreciated. The data stored in the data store 148, for example, is associated with the operation of the various applications and/or functional entities described below.

The components executed on the computing device 106, for example, include a session establishment application 151, a widget configuration application 154, a widget server application 157, and other applications, services, processes, systems, engines, or functionality not discussed in detail herein. The session establishment application 151 is executed to provide an interface for creating session identifiers for sessions associated with clients 109. The widget configuration application 154 is executed to provide configuration information for widgets (e.g., network page portions) that are served up by the computing device 106. Such configuration information may include endpoint data and definition data. The widget configuration application 154 may also be executed to obtain requests from administrative users associated with the computing device 103 to specify the endpoint data, the definition data, and/or other data in the configuration information. The widget configuration application 154 may then modify the configuration information in response to the requests.

The widget server application 157 is executed to provide widget data 133 in response to widget data requests 130 from the network page generation application 121. The widget server application 157 is also executed to provide supplemental data 135 in response to supplemental data requests 134 from the network page generation application 121. The widget server application 157, the widget configuration application 154, and/or the session establishment application 151 may include commercially available HTTP servers such as Apache® HTTP Server, Apache® Tomcat®, Microsoft® Internet Information Services (IIS), and/or other HTTP servers. In various embodiments, the widget server application 157, the widget configuration application 154, and/or the session establishment application 151 may be developed on top of .NET®, Java® Platform Enterprise Edition, or another framework.

The data stored in the data store 148 includes, for example, widget configuration data 160, widget definition data 163, widget source data 166, session data 169, cookie data 172, resource data 175, and potentially other data. The widget configuration data 160 includes various configuration information relating to widgets served up by the widget server application 157. The widget configuration data 160 may define an endpoint associated with a widget, for example, a URL. The widget configuration data 160 may also point to a widget definition in the widget definition data 163 and include other parameters. The widget definition data 163 may include various information about a widget, such as, for example, name, publisher, URLs associated with widget resources, widget properties, widget parameters, and so on.

The widget source data 166 includes various data used by the widget server application 157 in generating network page portions. To this end, the widget source data 166 may include, for example, templates, code, HTML, XML, CSS, XSLT, images, audio, video, multimedia, and/or other data. The session data 169 includes data relating to session identifiers for sessions that have been established by the session establishment application 151. The cookie data 172 relates to cookies that have been set by the widget server application 157. The resource data 175 includes various style sheets, code libraries, and/or other widget-related resources that may be served up by the widget server application 157 for use by the network page generation application 121 in generating network pages.

The client 109 is representative of a plurality of client devices that may be coupled to the network 112. The client 109 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 109 may include a display 178. The display 178 may comprise, for example, one or more devices such as cathode ray tubes (CRTs), liquid crystal display (LCD) screens, gas plasma-based flat panel displays, LCD projectors, or other types of display devices, etc.

The client 109 may be configured to execute various applications such as a browser 181 and/or other applications. The browser 181 may be executed in a client 109, for example, to access and render network pages, such as web pages, or other network content served up by the computing device 103 and/or other servers, thereby generating a rendered network page 184 on the display 178. The client 109 may be configured to execute applications beyond the browser 181 such as, for example, email applications, instant message applications, and/or other applications.

Next, a general description of the operation of the various components of the networked environment 100 is provided. To begin, a browser 181 executed in client 109 issues a network page request 127, which is sent over the network 112 to the network page server application 118. The network page server application 118 may provide the network page request 127 to the network page generation application 121, which generates a network page in response to the request.

The network page that has been requested may include one or more widgets, pagelets, portlets, etc. that generate portions of the network page. Such widgets may be hosted on third-party or external servers, such as the computing device 106. In various embodiments, the network page generation application 121 may engage in a discovery procedure to ascertain details regarding the widget. To this end, the network page generation application 121 may request widget configuration data 160 from the widget configuration application 154, which may be hosted locally on the computing device 103 or on the computing device 106. The configuration data may include definition information as well as an endpoint for the widget. Further widget definition data 163 may be obtained that includes information such as widget parameters, publisher name, name, style sheet resources, JavaScript resources, and so on.

Once configuration and definition information are obtained, the network page generation application 121 issues a widget data request 130 and/or a supplemental data request 134 to the appropriate widget server application 157 at the specified endpoint. In some embodiments, the widget data request 130 and/or the supplemental data request 134 may be an HTTP request with various non-standard headers. One example of a non-standard header may be "x-page-location," which corresponds to a base URL of the network page that is to be used by the widget when linking or otherwise referring to resources relative to the network page. The network page portion may be generated based at least in part on the base URL. Another example of a non-standard header may be "x-document-type," which may specify a document type to which the network page portion generated by the widget should conform.

Another example of a non-standard header may be "x-dom-id," which corresponds to a unique document object model (DOM) identifier assigned to the widget in the DOM of the network page. The DOM identifier value may be referenced by CSS, JavaScript, and/or other resources in the resource data 175 pertaining to the widget. The DOM identifier allows placement of more than one instance of the same widget within a network page. Yet another example of a non-standard header may be "x-widget-root," which may correspond to a base path or widget root identifier that may be used for Ajax or other callbacks in the client 109 for widget-related requests.

Also, the widget data request 130 and/or the supplemental data request 134 may include one or more parameters embedded in the query string or other portion of the URL in the request. In response to the widget data request 130, the widget server application 157 generates widget data 133, which may correspond to a network page portion. In response to a supplemental data request 134, the widget server application 157 generates supplemental data 135 related to a network page portion (e.g., data sent in response to an Ajax callback). The widget data 133 and/or the supplemental data 135 may be generated from the widget source data 166 in response to the non-standard headers as described above. The widget data 133 is sent over the network 112 to the network page generation application 121.

The network page generation application 121 generates the network page from the widget data 133 and the network page data 136. If supplemental data 135 is obtained, network page data 124 may be constructed by the network page generation application 121 from the supplemental data 135. It is noted that the network page generation application 121 may support, for example, HTTP-based cache control so that duplicate copies of the widget data 133 and/or the supplemental data 135 need not be obtained if a copy is already in the cached widget data 145. The network page is sent over the network 112 in the network page data 124 to the client 109 for rendering by the browser 181.

In various embodiments, a session identifier may be provided to the widget server application 157 to facilitate the generation of the widget data 133. The session identifier may be preexisting in the browser 181 and obtained as a cookie or in another network page request 127 parameter. However, if a session identifier is not present, the network page generation application 121 may be configured to register a new session and obtain a session identifier from the session establishment application 151. The session identifier may be stored in the cookie data 142 and/or as cookies in the browser 181. The session identifier may be designated by a special name such as "JSESSIONID," "PHPSESSID," or some other identifier. In some embodiments, the session identifier may be maintained through "GET" or "POST" parameters in a request rather than through cookies. The network page generation application 121 and other widgets may establish sessions as well. To mitigate the possibility of collisions, cookies set by the network page server application 118 may be scoped by publisher name as will be described.

Figure 2:
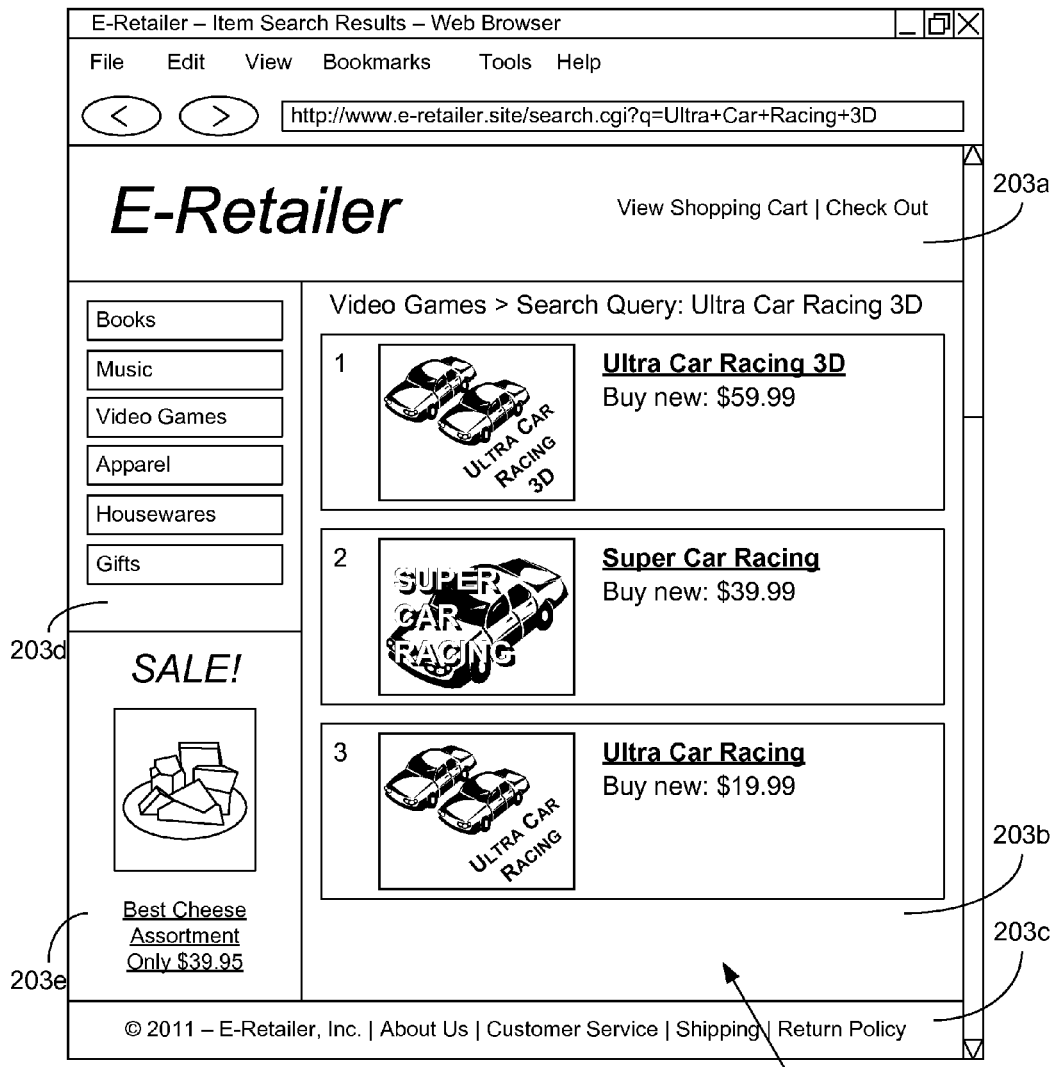
FIG. 2 is a drawing of an example of a user interface rendered by a client in the networked environment of FIG. 1 according to various embodiments of the present disclosure.

Moving on to FIG. 2, shown is one example of a user interface 200 rendered by a browser 181 (FIG. 1) executed in a client 109 (FIG. 1) in the networked environment 100 (FIG. 1). In particular, FIG. 2 illustrates one example of a rendered network page 184 that was generated by the network page generation application 121 (FIG. 1). The rendered network page 184 includes a plurality of display regions 203, each of which may correspond to a respective network page portion generated by the widget server application 157 (FIG. 1).

The display region 203a corresponds to a network page header, including a logo and navigational features. The display region 203b corresponds to a listing of search results. The display region 203c corresponds to a network page footer, with copyright information and navigational features. The display region 203d corresponds to a navigational menu. The display region 203e corresponds to a featured product area. Any one or more of the display regions 203 may be generated by a widget server application 157 as a network page portion. Alternatively, any one or more of the display regions 203 may be generated by the network page generation application 121 instead of the widget server application 157. In any case, the network page generation application 121 assembles any externally generated network page portions into the network page, which may appear as a single network page on the client 109.

Figure 3:
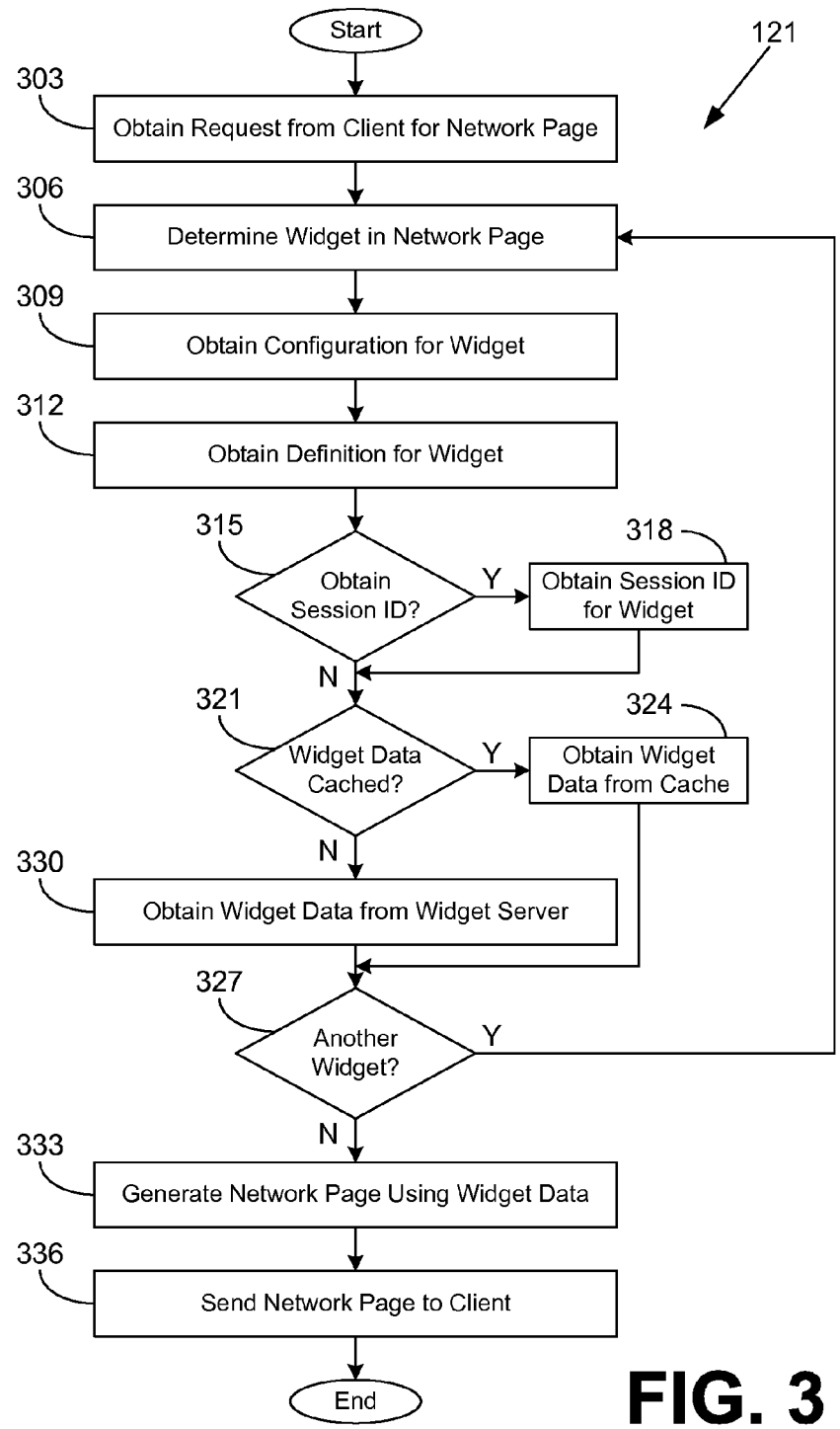
FIGS. 3-5 are flowcharts illustrating examples of functionality implemented as portions of network page generation application executed in a computing device in the networked environment of FIG. 1 according to various embodiments of the present disclosure.

Referring next to FIG. 3, shown is a flowchart that provides one example of the operation of a portion of the network page generation application 121 according to various embodiments. Various portions of the functionality described in FIG. 3 may be implemented in a network page server application 118 (FIG. 1) or in other applications in some embodiments. It is understood that the flowchart of FIG. 3 provides merely an example of the many different types of functional arrangements that may be employed to implement the operation of the portion of the network page generation application 121 as described herein. As an alternative, the flowchart of FIG. 3 may be viewed as depicting an example of steps of a method implemented in the computing device 103 (FIG. 1) according to one or more embodiments.

Beginning with box 303, the network page generation application 121 obtains a network page request 127 (FIG. 1) from a client 109 (FIG. 1) for a network page. In box 306, the network page generation application 121 determines a widget that is to be included in the network page. For example, a template for the network page in the network page data 136 (FIG. 1) may indicate that a display region 203 (FIG. 2) of the network page is to include a network page portion generated by a particular widget.

In box 309, the network page generation application 121 obtains a configuration for the widget from the widget configuration application 154 (FIG. 1). The configuration may include an endpoint for the widget, a definition for the widget, and/or other data. In box 312, the network page generation application 121 obtains the definition corresponding to the widget. The definition may indicate various resources that are to be obtained in conjunction with the network page portion, various parameters that are to be supplied to the widget server application 157 (FIG. 1), and/or other data.

In box 315, the network page generation application 121 determines whether a session identifier is to be obtained for the widget. In some cases, a session identifier may already be supplied by the client 109 in a cookie. In other cases, the network page generation application 121 may need to register a session and obtain a new session identifier. If a session identifier is to be obtained, the network page generation application 121 moves to box 318 and obtains a session identifier for use with the widget from the session establishment application 151 (FIG. 1). The network page generation application 121 then continues to box 321. If no session identifier is to be obtained, the network page generation application 121 also continues to box 321.

In box 321, the network page generation application 121 determines whether the widget data 133 (FIG. 1) to be requested is cached in the computing device 103. In one embodiment, the network page generation application 121 may issue a widget data request 130 (FIG. 1) to the widget server application 157 and use HTTP-based cache control to determine whether the correct version is cached. If the widget data 133 is cached in the computing device 103, the network page generation application 121 moves to box 324 and obtains the widget data 133 from the cached widget data 145 (FIG. 1). The network page generation application 121 then proceeds to box 327. If the widget data 133 is not cached in the computing device 103, the network page generation application 121 instead proceeds from box 321 to box 330.

In box 330, the network page generation application 121 issues a widget data request 130 and obtains the widget data 133 from the widget server application 157. Next, in box 327, the network page generation application 121 determines whether another widget is to be included in the network page. If another widget is to be included in the network page, the network page generation application 121 returns to box 306. It is noted that the network page generation application 121 may parallelize the processing of multiple widgets in some embodiments. If the network page generation application 121 determines that no widgets remain to be included, the network page generation application 121 transitions to box 333.

In box 333, the network page generation application 121 generates the network page using the widget data 133. For example, the network page generation application 121 may concatenate the various network page portions from the widget data 133 with internally generated network page portions. In box 336, the network page generation application 121 sends the generated network page to the client 109. In some embodiments, data making up the network page may be flushed as it is generated. For example, a portion of the network page may be generated and sent to the client 109 after widget data 133 for a first widget on the network page is obtained but before widget data 133 has been obtained for a second widget on the network page. Thereafter, the portion of the network page generation application 121 ends.

Figure 4A:
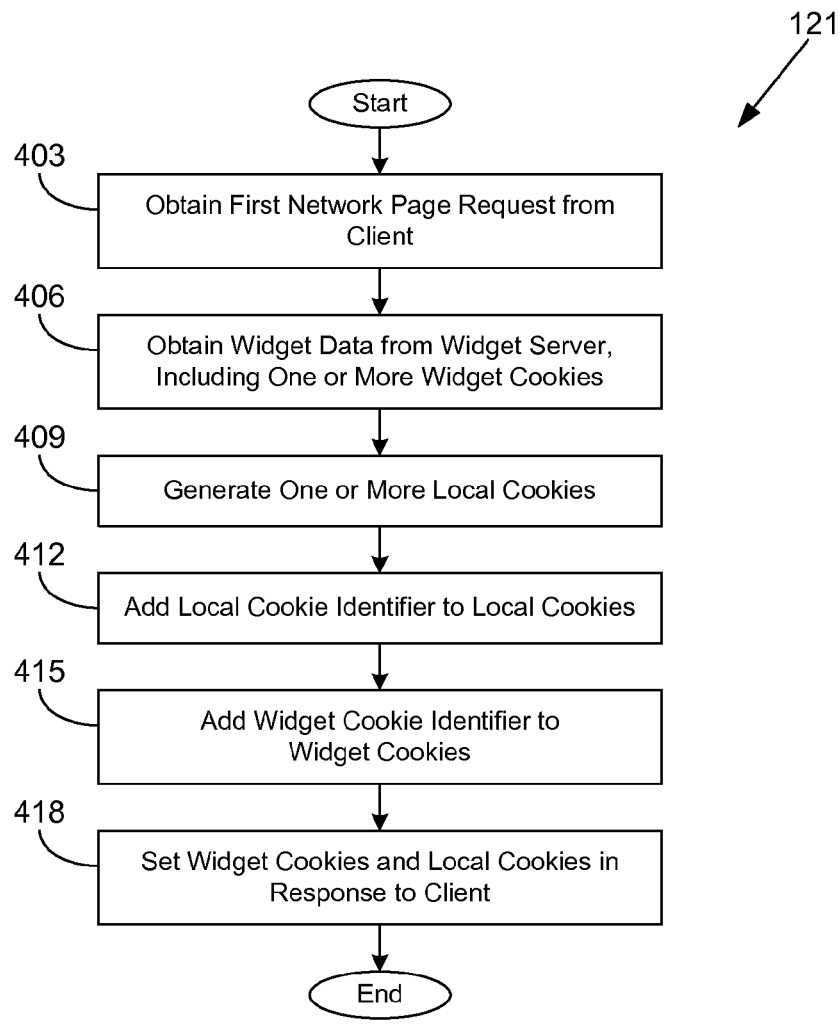

Turning now to FIG. 4A, shown is a flowchart that provides one example of the operation of another portion of the network page generation application 121 according to various embodiments. In particular, FIG. 4A relates to the setting of cookies. Various portions of the functionality described in FIG. 4A may be implemented in a network page server application 118 (FIG. 1) or in other applications in some embodiments. It is understood that the flowchart of FIG. 4A provides merely an example of the many different types of functional arrangements that may be employed to implement the operation of the portion of the network page generation application 121 as described herein. As an alternative, the flowchart of FIG. 4A may be viewed as depicting an example of steps of a method implemented in the computing device 103 (FIG. 1) according to one or more embodiments.

Beginning with box 403, the network page generation application 121 obtains a first network page request 127 (FIG. 1) from the client 109 (FIG. 1). In box 406, the network page generation application 121 obtains widget data 133 (FIG. 1) from the widget server application 157 (FIG. 1). The widget data 133 is an HTTP response that sets one or more cookies corresponding to the widget. In box 409, the network page generation application 121 may generate one or more local cookies to be set in the client 109. In box 412, the network page generation application 121 adds a local cookie identifier to the local cookies. For example, the network page generation application 121 may concatenate a publisher name and delimiter with the parameter name of a local cookie.

In box 415, the network page generation application 121 adds a widget cookie identifier to the widget cookies. For example, the network page generation application 121 may concatenate a publisher name and delimiter with the parameter name of the widget cookie. In one embodiment, the publisher name is obtained in the definition of the widget. In box 418, the network page generation application 121 sets the widget cookies and the local cookies in an HTTP response in the network page data 124 (FIG. 1) sent to the client 109. The domain of the cookie may be set to be the domain associated with the computing device 103. Thereafter, the portion of the network page generation application 121 ends.

Figure 4B:
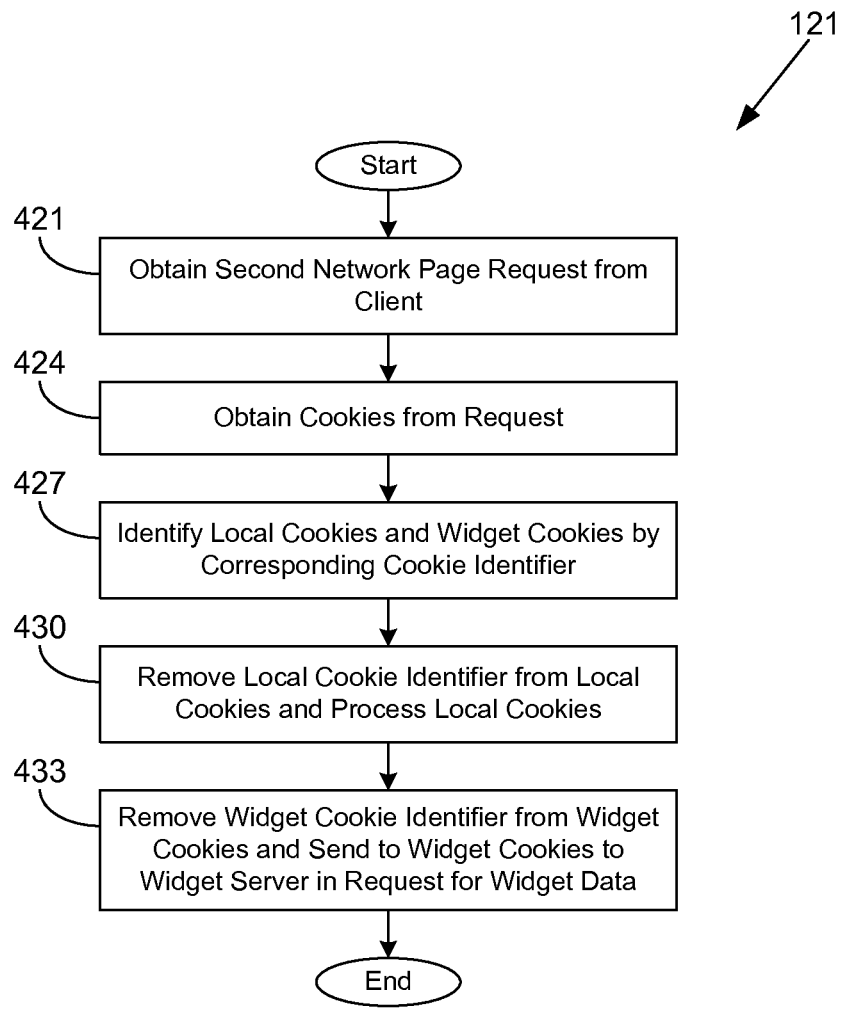

Continuing to FIG. 4B, shown is a flowchart that provides one example of the operation of another portion of the network page generation application 121 according to various embodiments. In particular, FIG. 4B relates to obtaining cookies. Various portions of the functionality described in FIG. 4B may be implemented in a network page server application 118 (FIG. 1) or in other applications in some embodiments. It is understood that the flowchart of FIG. 4B provides merely an example of the many different types of functional arrangements that may be employed to implement the operation of the portion of the network page generation application 121 as described herein. As an alternative, the flowchart of FIG. 4B may be viewed as depicting an example of steps of a method implemented in the computing device 103 (FIG. 1) according to one or more embodiments.

Beginning with box 421, the network page generation application 121 obtains a second network page request 127 (FIG. 1) from a client 109 (FIG. 1). In box 424, the network page generation application 121 obtains one or more cookies from the HTTP headers of the second network page request 127. In box 427, the network page generation application 121 identifies which of the cookies are local cookies or widget cookies according to the corresponding cookie identifier for each cookie. For example, a publisher name and delimiter may be prepended or prefixed to each cookie. It is noted that multiple cookies may be associated with multiple widgets with different publisher names.

In box 430, the network page generation application 121 removes the local cookie identifier from the local cookies and begins processing the local cookies. In box 433, the network page generation application 121 removes the widget cookie identifier from the widget cookies. The network page generation application 121 sends the cookies to the appropriate widget server application 157 (FIG. 1) within the HTTP headers of a widget data request 130 (FIG. 1). It is noted that local cookies are not forwarded to the widget server applications 157. Further, a widget cookie belonging to one publisher is not forwarded to a widget server application 157 that is associated with a different publisher. By scoping cookies by publisher, the risk of cookie collisions is mitigated and privacy is preserved. Thereafter, the portion of the network page generation application 121 ends.

Figure 5:
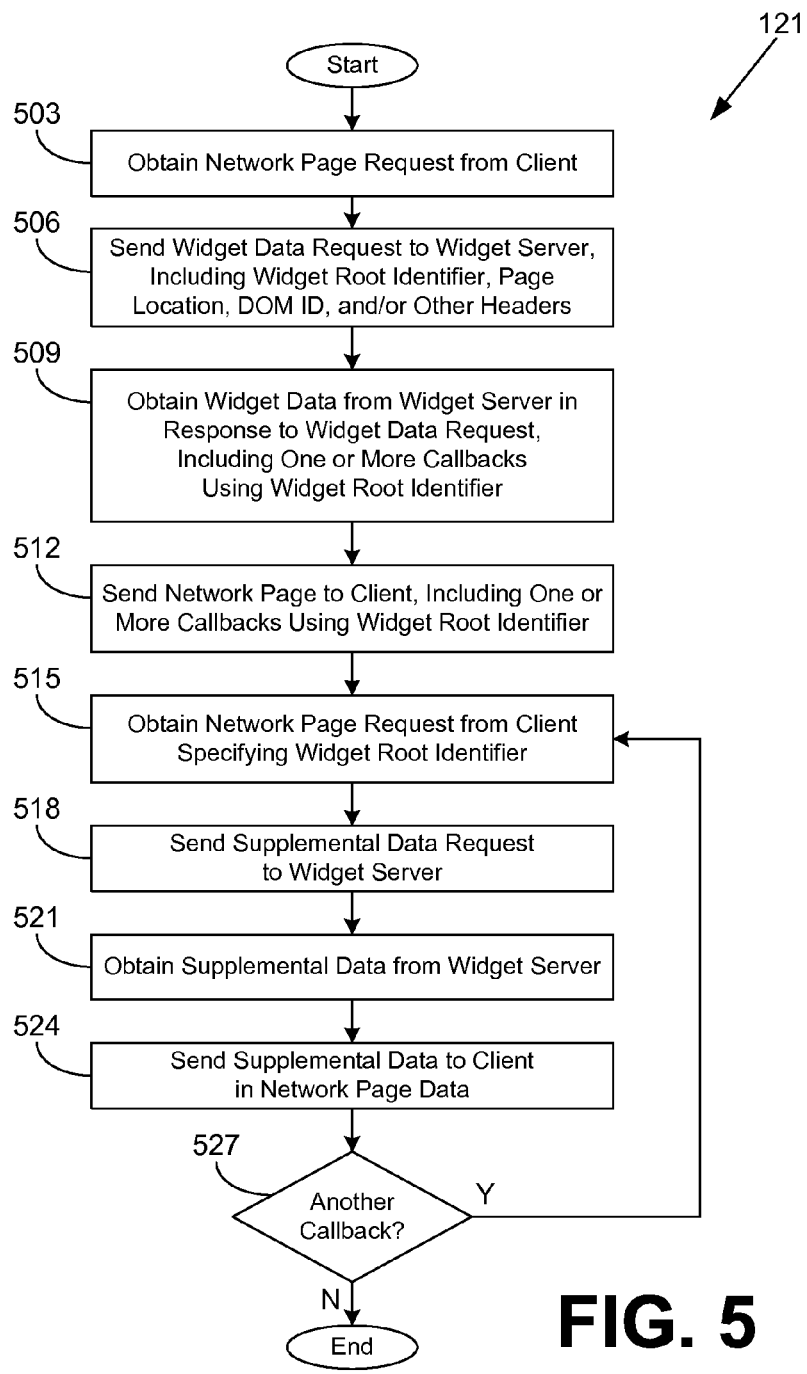

Referring next to FIG. 5, shown is a flowchart that provides one example of the operation of yet another portion of the network page generation application 121 according to various embodiments. FIG. 5 relates, for example, to Ajax support. Various portions of the functionality described in FIG. 5 may be implemented in a network page server application 118 (FIG. 1) or in other applications in some embodiments. It is understood that the flowchart of FIG. 5 provides merely an example of the many different types of functional arrangements that may be employed to implement the operation of the portion of the network page generation application 121 as described herein. As an alternative, the flowchart of FIG. 5 may be viewed as depicting an example of steps of a method implemented in the computing device 103 (FIG. 1) according to one or more embodiments.

Beginning with box 503, the network page generation application 121 obtains a network page request 127 (FIG. 1) for a network page from a client 109 (FIG. 1). The network page to be generated includes one or more network portions that are associated with a widget. In box 506, the network page generation application 121 sends a widget data request 130 (FIG. 1) to the widget server application 157 (FIG. 1). The widget data request 130 includes a widget root identifier that will be used by the client 109 to identify the widget. The widget root identifier may correspond to a base path for a URL. The widget data request 130 may also include a page location header that corresponds to a base URL, a DOM identifier header, and/or other non-standard headers.

In box 509, the network page generation application 121 obtains widget data 133 (FIG. 1) from the widget server application 157 in response to the widget data request 130 and based at least in part on one or more of the non-standard headers in the widget data request 130. The widget data 133 includes one or more client-side callbacks that use the widget root identifier. As a non-limiting example, the widget data 133 may include JavaScript code that is configured to issue an HTTP request specifying a URL that includes the widget root identifier. As another non-limiting example, the widget data 133 may include an image resource specifying a URL that includes the widget root identifier. In box 512, the network page generation application 121 sends a network page to the client 109 in the network page data 124 (FIG. 1). The network page data 124 includes one or more client-side callbacks that use the widget root identifier.

In box 515, the network page generation application 121 obtains a network page request 127 from the client 109 specifying the widget root identifier, where the network page request 127 originated in a client-side callback. The client-side callback may correspond, for example, to an Ajax-generated request. In box 518, the network page generation application 121 sends a supplemental data request 134 (FIG. 1) to the appropriate widget server application 157. The network page generation application 121 identifies the appropriate widget server application 157 according to the widget root identifier.

In box 521, the network page generation application 121 obtains supplemental data 135 (FIG. 1) from the widget server application 157 in response to the request. In box 524, the network page generation application 121 sends the supplemental data 135 to the client 109 as the network page data 124. It is noted that the network page data 124 may be data related to the previous network page data 124 such as JSON data, XML data, etc. that may be used, for example, to update the network page. In box 527, the network page generation application 121 determines whether another client-side callback is to be obtained. If another client-side callback is to be obtained, the network page generation application 121 returns to box 515 and obtains another network page request 127. Otherwise, the portion of the network page generation application 121 ends.

Figure 6:
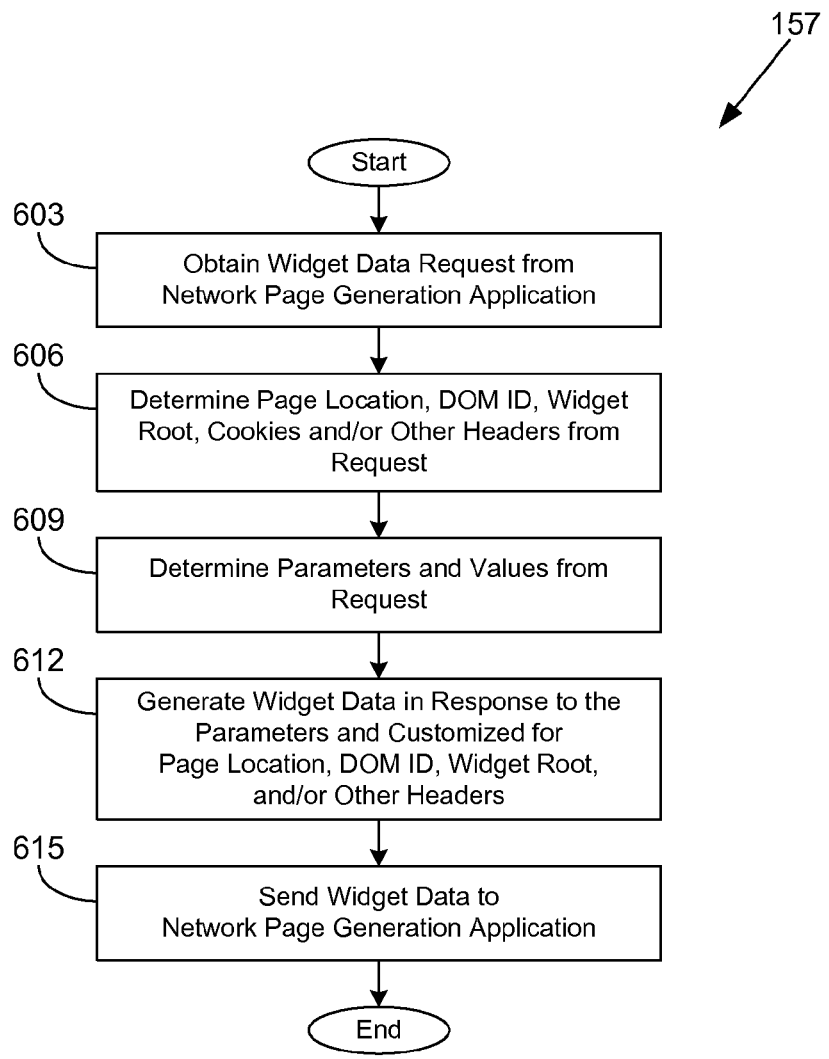
FIG. 6 is a flowchart illustrating one example of functionality implemented as portions of a widget server application executed in a computing device in the networked environment of FIG. 1 according to various embodiments of the present disclosure.

Turning now to FIG. 6, shown is a flowchart that provides one example of the operation of a portion of the widget server application 157 according to various embodiments. It is understood that the flowchart of FIG. 6 provides merely an example of the many different types of functional arrangements that may be employed to implement the operation of the portion of the widget server application 157 as described herein. As an alternative, the flowchart of FIG. 6 may be viewed as depicting an example of steps of a method implemented in the computing device 106 (FIG. 1) according to one or more embodiments.

Beginning with box 603, the widget server application 157 obtains a widget data request 130 (FIG. 1) from the network page generation application 121 (FIG. 1) over the network 112 (FIG. 1). In box 606, the widget server application 157 determines the page location, DOM identifier, widget root identifier, cookies, and/or other HTTP headers in the widget data request 130. In box 609, the widget server application 157 determines parameters and their values that are specified in the widget data request 130. Such parameters may be specified, for example, in the query string of a URL included in the widget data request 130.

In box 612, the widget server application 157 generates widget data 133 (FIG. 1) in response to the parameters. The widget data 133 is customized for the page location, DOM identifier, widget root identifier, and/or other headers. For example, URLs included within the widget data 133 are modified to include the base URL specifying the page location. The DOM identifier, which describes a unique identifier for the widget within a DOM of a network page, is referenced by one or more resources associated with the widget. The widget root identifier may be used by Ajax code within the widget data 133 to send requests back to the network page server application 118 (FIG. 1) that are directed to the widget. In box 615, the widget server application 157 sends the widget data 133 to the network page generation application 121 over the network 112. Thereafter, the portion of the widget server application 157 ends.

Figure 7:
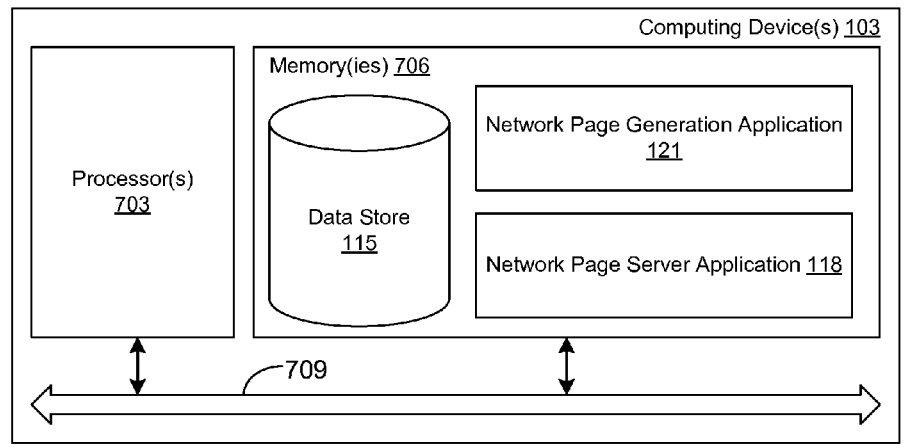
FIGS. 7 and 8 are schematic block diagrams that provide example illustrations of computing devices employed in the networked environment of FIG. 1 according to various embodiments of the present disclosure.

With reference to FIG. 7, shown is a schematic block diagram of an exemplary computing device 103 according to an embodiment of the present disclosure. The computing device 103 includes at least one processor circuit, for example, having a processor 703 and a memory 706, both of which are coupled to a local interface 709. To this end, the computing device 103 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the network page server application 118, the network page generation application 121, and potentially other applications. Also stored in the memory 706 may be a data store 115 and other data. In addition, an operating system may be stored in the memory 706 and executable by the processor 703.

Figure 8:
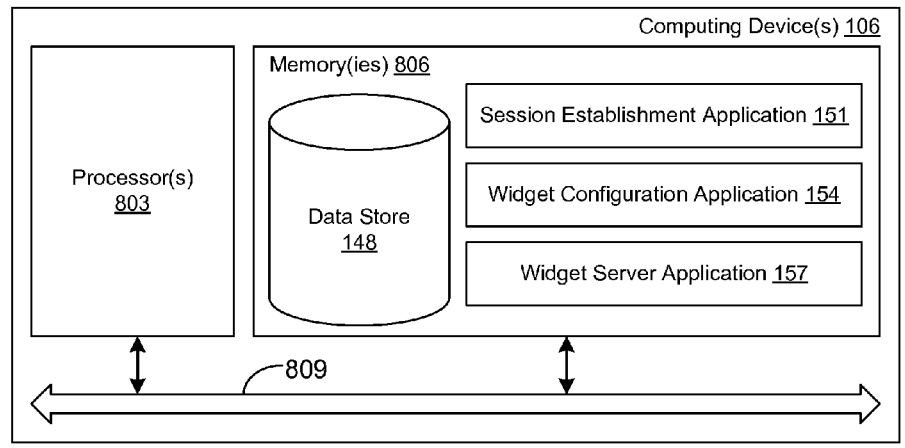

With reference to FIG. 8, shown is a schematic block diagram of the computing device 106 according to an embodiment of the present disclosure. The computing device 106 includes at least one processor circuit, for example, having a processor 803 and a memory 806, both of which are coupled to a local interface 809. To this end, the computing device 106 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the session establishment application 151, the widget configuration application 154, the widget server application 157, and potentially other applications. Also stored in the memory 806 may be a data store 148 and other data. In addition, an operating system may be stored in the memory 806 and executable by the processor 803.

Referring now to both FIGS. 7 and 8, it is understood that there may be other applications that are stored in the memory 706, 806 and are executable by the processors 703, 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 706, 806 and are executable by the processor 703, 803. In this respect, the term "executable" means a program file that is in a form that can ultimately be run by the processor 703, 803. Examples of executable programs may be, for example, a compiled program that can be translated into machine code in a format that can be loaded into a random access portion of the memory 706, 806 and run by the processor 703, 803, source code that may be expressed in proper format such as object code that is capable of being loaded into a random access portion of the memory 706, 806 and executed by the processor 703, 803, or source code that may be interpreted by another executable program to generate instructions in a random access portion of the memory 706, 806 to be executed by the processor 703, 803, etc. An executable program may be stored in any portion or component of the memory 706, 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706, 806 is defined herein as including both volatile and nonvolatile memory and data storage components. Volatile components are those that do not retain data values upon loss of power. Nonvolatile components are those that retain data upon a loss of power. Thus, the memory 706, 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703, 803 may represent multiple processors 703, 803 and the memory 706, 806 may represent multiple memories 706, 806 that operate in parallel processing circuits, respectively. In such a case, the local interface 709, 809 may be an appropriate network 112 (FIG. 1) that facilitates communication between any two of the multiple processors 703, 803, between any processor 703, 803 and any of the memories 706, 806, or between any two of the memories 706, 806, etc. The local interface 709, 809 may comprise additional systems designed to coordinate this communication, including, for example, performing load balancing. The processor 703, 803 may be of electrical or of some other available construction.

Although the network page server application 118, the network page generation application 121, the session establishment application 151, the widget configuration application 154, the widget server application 157, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3-6 show the functionality and operation of an implementation of portions of the network page generation application 121 and the widget server application 157. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703, 803 in a computer system or other system. The machine code may be converted from the source code, etc. If embodied in hardware, each block may represent a circuit or a number of interconnected circuits to implement the specified logical function(s).

Although the flowcharts of FIGS. 3-6 show a specific order of execution, it is understood that the order of execution may differ from that which is depicted. For example, the order of execution of two or more blocks may be scrambled relative to the order shown. Also, two or more blocks shown in succession in FIGS. 3-6 may be executed concurrently or with partial concurrence. Further, in some embodiments, one or more of the blocks shown in FIGS. 3-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network page server application 118, the network page generation application 121, the session establishment application 151, the widget configuration application 154, and the widget server application 157, that comprises software or code can be embodied in any non-transitory computer-readable medium for use by or in connection with an instruction execution system such as, for example, a processor 703, 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
    code that obtains a first hypertext transfer protocol (HTTP) request for a network page from a client;
    code that identifies a plurality of network page portions of the network page and requests corresponding configurations for individual ones of the plurality of network page portions from a configuration application;
    code that sends a second HTTP request for a first one of the identified network page portions to a first server application, the second HTTP request including a first configuration of the corresponding configurations and a non-standard HTTP header that specifies a base uniform resource locator (URL) identifying the network page;
    code that obtains the first one of the identified network page portions from the first server application, wherein the first one of the identified network page portions is based at least in part on the base URL and the first configuration;
    code that sends a third HTTP request for a second one of the identified network page portions to a second server application, the third HTTP request including a second configuration and the non-standard HTTP header that specifies the base URL;
    code that obtains the second one of the identified network page portions from the second server application, wherein the second one of the identified network page portions is based at least in part on the base URL;
    code that generates the network page from the first one of the identified network page portions, the second one of the identified network page portions, and other data; and
    code that sends the network page to the client in response to the first HTTP request.

2. The non-transitory computer-readable medium of claim 1, wherein the first HTTP request includes a first cookie associated with the first server application and a second cookie associated with the second server application, wherein each cookie includes a respective publisher identification, the second HTTP request includes the first cookie without the respective publisher identification, and the third HTTP request includes the second cookie without the respective publisher identification.

3. The non-transitory computer-readable medium of claim 2, wherein the first cookie corresponds to a first session identification associated with the first server application, and the second cookie corresponds to a second session identification associated with the second server application.

4. A system, comprising:
    at least one computing device; and
    a network page generation application executable in the at least one computing device, the network page generation application comprising:
        logic that obtains a first request for a network page;

logic that identifies a network page portion of the network page and obtains configuration information for the network page portion from a configuration application;

logic that sends a second request for the network page portion to a server application, the second request including a first protocol header and a second protocol header, wherein:

the first protocol header specifies a base uniform resource locator (URL) and the configuration information for the network page portion, wherein the base URL identifies the network page, the second protocol header identifies a base path specifying a network location of the network page portion, wherein the network page portion includes a callback that incorporates the base path;

logic that obtains a third request from a client, the third request being generated by the callback in the network page portion, the third request specifying the base path within a requested URL;

logic that identifies the server application according to the base path;

logic that obtains the network page portion from the server application, wherein the network page portion is based at least in part on the base URL and the configuration information; and logic that generates the network page from the network page portion and other data.

5. The system of claim 4, wherein the first request includes a cookie having an identifier of the server application, and the second request includes the cookie with the identifier of the server application removed.

6. The system of claim 5, wherein the first request includes another cookie having a different identifier, and the second request does not include the another cookie.

7. The system of claim 4, wherein the network page generation application further comprises:

logic that obtains a session identifier from a session establishment application associated with the server application; and logic that provides the session identifier within the second request.

8. The system of claim 7, wherein the network page generation application further comprises logic that returns a cookie including the session identifier with the network page portion.

9. The system of claim 4, wherein the network page generation application further comprises:

logic that obtains configuration data regarding the network page portion;

logic that obtains definition data regarding the network page portion based at least in part on the configuration data; and logic that generates a request URL for the second request according to an endpoint specified in the configuration data, the request URL including a plurality of parameters determined at least in part from the definition data.

10. The system of claim 9, wherein the configuration application is executable in the at least one computing device, the configuration application comprising:

logic that obtains a configuration request from an administrative user to specify the endpoint in the configuration data; and logic that modifies the configuration data to specify the endpoint in response to the configuration request.

11. The system of claim 4, wherein the network page generation application further comprises:

logic that sends a fourth request for data relating to the network page portion to the server application in response to the third request;

logic that obtains the data relating to the network page portion from the server application; and logic that sends the data relating to the network page portion to the client.

12. The system of claim 4, wherein the second request includes another protocol header that specifies a document object model (DOM) identifier that is unique within a DOM of the network page, and the network page portion includes at least one resource that references the DOM identifier.

13. The system of claim 4, wherein the second request includes another protocol header that specifies a document type, and the network page portion conforms to the document type.

14. The system of claim 4, further comprising a network page server application executable in the at least one computing device, the network page server application comprising:

logic that obtains the first request from a client; and logic that sends the network page to the client in response to the first request.

15. The system of claim 4, wherein the first request and the second request are hypertext transfer protocol (HTTP) requests.

16. The system of claim 15, wherein the protocol header is an HTTP non-standard header.

17. A method, comprising:

obtaining, in at least one computing device, a first request for a network page from a client;

sending, in the at least one computing device, a second request for a network page portion to a server application, the second request including a protocol header that specifies a base path identifying a location of the network page portion;

obtaining, in the at least one computing device, the network page portion from the server application, wherein the base path is included in at least one client-side callback embedded in the network page portion;

obtaining, in the at least one computing device, a third request from the client, the third request being generated by the at least one client-side callback and specifying the base path within a requested uniform resource locator (URL);

identifying, in the at least one computing device, the server application according to the base path;

generating, in the at least one computing device, the network page from the network page portion and other data; and sending, in the at least one computing device, the network page to the client in response to the first request.

18. The method of claim 17, further comprising:

sending, in the at least one computing device, a fourth request for data relating to the network page portion to the server application in response to the third request;

obtaining, in the at least one computing device, the data relating to the network page portion from the server application; and sending, in the at least one computing device, the data relating to the network page portion to the client.

19. The method of claim 17, further comprising:

determining, in the at least one computing device, whether the network page portion is cached; and obtaining, in the at least one computing device, the network page portion from a cache instead of the server application when the network page portion is cached.

20. The method of claim 17, wherein the second request includes another protocol header that specifies a base uniform resource locator (URL), and the network page portion is based at least in part on the base URL.

21. The method of claim 17, wherein the second request includes another protocol header that specifies a document object model (DOM) identifier that is unique within a DOM of the network page, and the network page portion includes at least one resource that references the DOM identifier.

22. The method of claim 17, further comprising:
- obtaining, in the at least one computing device, configuration data regarding the network page portion;
- obtaining, in the at least one computing device, definition data regarding the network page portion based at least in part on the configuration data; and
- generating, in the at least one computing device, a request uniform resource locator (URL) for the second request according to an endpoint specified in the configuration data, the request URL including a plurality of parameters determined at least in part from the definition data.

* * * * *